US012689061B2

(12) United States Patent
Dai et al.

(10) Patent No.: US 12,689,061 B2
(45) Date of Patent: Jul. 21, 2026

(54) SYNERGISTIC ADDITIVES FOR HIGH VOLUME LITHIUM ION BATTERIES

(71) Applicant: Apple Inc., Cupertino, CA (US)

(72) Inventors: Hongli Dai, Los Altos, CA (US);
Jongho Jeon, Cupertino, CA (US);
Libo Hu, Sunnyvale, CA (US); Mingfu He, Lemont, IL (US); Qian Liu,
Lemont, IL (US); Zhengcheng Zhang,
Lemont, IL (US)

(73) Assignee: Apple Inc., Cupertino, CA (US)

( * ) Notice: Subject to any disclaimer, the term of this patent is extended or adjusted under 35 U.S.C. 154(b) by 501 days.

(21) Appl. No.: 17/950,430

(22) Filed: Sep. 22, 2022

(65) Prior Publication Data

US 2023/0107327 A1     Apr. 6, 2023

Related U.S. Application Data

(60) Provisional application No. 63/248,221, filed on Sep. 24, 2021, provisional application No. 63/248,229, filed on Sep. 24, 2021.

(51) Int. Cl.
| | |
|---|---|
| *H01M 10/0567* | (2010.01) |
| *H01M 4/04* | (2006.01) |
| *H01M 10/0525* | (2010.01) |
| *H01M 10/0568* | (2010.01) |
| *H01M 10/0569* | (2010.01) |
| *H01M 50/46* | (2021.01) |

(52) U.S. Cl.
CPC ..... *H01M 10/0567* (2013.01); *H01M 4/0404* (2013.01); *H01M 10/0525* (2013.01); *H01M 10/0568* (2013.01); *H01M 10/0569* (2013.01);

*H01M 50/46* (2021.01); *H01M 2300/0028* (2013.01); *H01M 2300/0051* (2013.01)

(58) Field of Classification Search
CPC ..... H01M 10/0569; H01M 2300/0042; H01M 2300/0028; H01M 10/0525; H01M 10/0567; H01M 10/0568; H01M 2300/0017; H01M 2300/0034; H01M 2300/0037
See application file for complete search history.

(56) References Cited

U.S. PATENT DOCUMENTS

| | | | |
|---|---|---|---|
| 6,033,809 A | 3/2000 | Hamamoto et al. | |
| 9,006,457 B2 | 4/2015 | Schmidt et al. | |
| (Continued) | | | |

FOREIGN PATENT DOCUMENTS

| | | |
|---|---|---|
| CN | 101210000 A | 7/2008 |
| CN | 103259043 A | 8/2013 |
| (Continued) | | |

OTHER PUBLICATIONS

An, F., Zhao, H., Zhou, W. et al. S-containing and Si-containing compounds as highly effective electrolyte additives for SiOx-based anodes/NCM 811 cathodes in lithium ion cells. Sci. Rep. 9, 14108 (Year: 2019).*

(Continued)

*Primary Examiner* — Marla D Mcconnell
*Assistant Examiner* — Julia S Caserto
(74) *Attorney, Agent, or Firm* — BakerHostetler

(57) ABSTRACT

This disclosure relates generally to battery cells, and more particularly, electrolyte additives for use in lithium ion battery cells.

3 Claims, 7 Drawing Sheets

(56) References Cited

U.S. PATENT DOCUMENTS

| | | | |
|---|---|---|---|
| 10,056,649 | B2 | 8/2018 | Li et al. |
| 10,141,572 | B2 | 11/2018 | Wu et al. |
| 10,297,823 | B2 | 5/2019 | Dai et al. |
| 10,597,307 | B2 | 3/2020 | Dai et al. |
| 10,615,413 | B2 | 4/2020 | Dai et al. |
| 11,362,331 | B2 | 6/2022 | Dai et al. |
| 11,695,108 | B2 | 7/2023 | Wang et al. |
| 11,749,799 | B2 | 9/2023 | Wu et al. |
| 11,757,096 | B2 | 9/2023 | Dai et al. |
| 12,074,321 | B2 | 8/2024 | Dai et al. |
| 12,206,100 | B2 | 1/2025 | Dai et al. |
| 2007/0099079 | A1 | 5/2007 | Matsumoto et al. |
| 2008/0305400 | A1 | 12/2008 | Biensan et al. |
| 2009/0111019 | A1 | 4/2009 | Hirose et al. |
| 2009/0136838 | A1 | 5/2009 | Abe et al. |
| 2010/0069667 | A1 | 3/2010 | Hajime et al. |
| 2011/0150736 | A1 | 6/2011 | Hagiwara et al. |
| 2011/0151317 | A1 | 6/2011 | Giroud et al. |
| 2012/0100417 | A1* | 4/2012 | Ramprasad ....... H01M 10/0567 |
| | | | 429/188 |
| 2012/0107728 | A1* | 5/2012 | Ryu ...................... H01M 4/405 |
| | | | 429/188 |
| 2012/0288771 | A1 | 11/2012 | Lim et al. |
| 2014/0155566 | A1 | 6/2014 | Ignatyen et al. |
| 2015/0064549 | A1 | 3/2015 | Pinnell et al. |
| 2015/0140421 | A1 | 5/2015 | Ihara et al. |
| 2017/0263928 | A1 | 9/2017 | Dai et al. |
| 2017/0288268 | A1* | 10/2017 | Kim .................. H01M 10/0569 |
| 2020/0044242 | A1 | 2/2020 | Wang et al. |
| 2020/0044285 | A1 | 2/2020 | Su et al. |
| 2020/0058933 | A1 | 2/2020 | Wu et al. |
| 2021/0057739 | A1 | 2/2021 | Dai et al. |
| 2021/0057740 | A1 | 2/2021 | Dai et al. |
| 2021/0057745 | A1 | 2/2021 | Dai et al. |
| 2021/0194059 | A1 | 6/2021 | Zhang et al. |
| 2023/0094322 | A1 | 3/2023 | Peng et al. |
| 2023/0246185 | A1 | 8/2023 | Zhang et al. |
| 2025/0054993 | A1 | 2/2025 | Zhao et al. |

FOREIGN PATENT DOCUMENTS

| | | | |
|---|---|---|---|
| CN | 103618111 | A | 3/2014 |
| CN | 110718715 | A | 1/2020 |
| CN | 111816922 | A | 10/2020 |
| CN | 111969250 | A | 11/2020 |
| CN | 112652817 | A | 4/2021 |
| JP | 2006-210022 | A | 8/2006 |
| JP | 3856583 | B2 | 12/2006 |
| JP | 2015-118852 | A | 6/2015 |
| JP | 2017-004638 | A | 1/2017 |
| KR | 2023-0044353 | A | 4/2023 |
| WO | WO 2017/160852 | A1 | 9/2017 |
| WO | WO 2018/057584 | A1 | 3/2018 |
| WO | WO 2022/188037 | A1 | 9/2022 |
| WO | WO 2023/134262 | A1 | 7/2023 |

OTHER PUBLICATIONS

Arumugam et al., Special synergy between electrolyte additives and positive electrode surface coating to enhance the performance of Li[Ni0.6Mn0.2Co0.2]O2/Graphite cells. Journal of the Electrochemical Society, 163 A2531 (Year: 2016).*

Ma, L. et al. Improving the High Voltage Cycling of Li[Ni0.42Mn0.42Co0.16]O2 (NMC442)/Graphite Pouch Cells Using Electrolyte Additives. Journal of the Electrochemical Society. 161, A2250 (Year: 2014).*

Wang, D. Y. et al. A Systemic Study of Electrolyte Additives in Li[Ni1/3Mn1/3Co1/3]O2 (NMC)/Graphite Pouch Cells. Journal of the Electrochemical Society. 161, A1818. (Year: 2014).*

Xia, J. et al. Improving the long term cycling performance of lithium ion batteries at elevated temperature with electrolyte additives. Journal of Power Sources. 287, 377-385 (Year: 2015).*

Zuo, X. et al. Effect of tris(trimethylsilyl)borate on the high voltage capacity retention of LiNi0.5Co0.2Mn0.3O2/graphite cells. Journal of Power Sources. 229, 308-312 (Year: 2013).*

Zhao et al.; "Dual-functionalised ionic liquids: synthesis and characterization of imidazolium salts with a nitrile-functionalised anion"; The Royal Society Chemistry; 2004; p. 2500-2501.

Zhang et al.; "Investigation of the synergetic effects of LiBF4 and LiODFB as wide-temperature electrolyte salts in lithium-ion batteries"; Ionics; vol. 24; 2018; p. 2995-3004.

Kowsari and Ebrahimi, Phys. Chem. Chem. Phys., 2018,20, 13379-13393. [Title and Abstract only].

Nokemann et al.; "Cobalt(II) Complexes of Nitrile-Functionalized Ionic Liquids"; Chem. Eur. J.; vol. 16, 2010; p. 1849-1858.

Oldiges et al.; "Understanding transport mechanisms in ionic liquid/carbonate solvent electrolyte blends"; Royal Society of Chemistry; vol. 20; 2018; p. 16579-16591.

Cong et al.; "Design and synthesis of functional ionic liquids based on pyrrolidinium cations bearing alkyl nitrile moieties": Royal Society of Chemistry; vol. 2; 2014; p. 20147-20153.

Qi et al.; "High-Voltage Resistant Ionic Liquids for Lithium-Ion Batteries"; ACS Applied Materials & Interfaces; vol. 12; 2020; p. 591-600.

An et al.; "S-containing and Si-containing compounds as highly effective electrolyte additives for SiOx-based anodes/NCM 811 cathodes in lithium ion cells"; Scientific Reports; vol. 9; 2019; 16 pages.

Arumugam et al.; "Special Synergy between Electrolyte Additives and Positive Electrode Surface Coating to Enhance the Performance of Li[Ni0.6Mn0.2Co0.2]O2/Graphite Cells"; Journal of the Electrochemical Society; vol. 163; 2016; p. A2531-A2538.

* cited by examiner

FIG. 5

SYNERGISTIC ADDITIVES FOR HIGH VOLUME LITHIUM ION BATTERIES

PRIORITY

This patent application claims the benefit of U.S. Provisional Patent Application No. 63/248,229, entitled "Synergistic Additives for High Volume Lithium Ion Batteries," filed on Sep. 24, 2021, and U.S. Provisional Patent Application No. 63/248,221, entitled "Synergistic Additives for High Volume Lithium Ion Batteries," filed on Sep. 24, 2021, both of which are incorporated herein by reference in its entirety.

U.S. GOVERNMENT LICENSE RIGHTS

This invention was made with U.S. government support under WFO Proposal No. 85C85. This invention was made under a CRADA 1500801 between Apple Inc. and Argonne National Laboratory operated for the United States Department of Energy. The U.S. government has certain rights in the invention.

FIELD

This disclosure relates generally to battery cells, and more particularly, electrolyte additives for use in lithium ion battery cells.

BACKGROUND

Li-ion batteries are widely used as the power sources in consumer electronics. Consumer electronics need Li-ion batteries which can deliver higher volumetric energy densities and sustain more discharge-charge cycles. A Li-ion battery typically works at a voltage up to 4.45 V (full cell voltage).

A battery life cycle can deteriorate due to instability of cathode structure and electrolyte degradation. The cathode material stability can be improved by the modification of $LiCoO_2$ such as doping and surface coating. Limited progress has been made in developing electrolytes that can enable both high volumetric energy densities and long battery cycling life. Most existing electrolytes suffer from poor ability to form stable cathode-electrolyte interphase (CEI) and/or SEI, leading to fast interfacial impedance growth and capacity decay.

SUMMARY

In a first aspect, the disclosure is directed to an electrolyte fluid including tris(trimethylsilyl)borate (TMSB), prop-1-ene-1,3-sultone (PES), and methylene methanedisulfonate (MMDS).

In a second aspect, the disclosure is directed to an electrolyte fluid including TMSB, fluoroethylene carbonate (FEC), butane sultone (BS), and PES.

In a third aspect, the disclosure is directed to an electrolyte fluid including TMSB, FEC, propane sultone (PS), and $LiBF_4$.

In a fourth aspect, the electrolyte fluid can include an electrolyte salt selected from $LiPF_6$, $LiBF_4$, $LiClO_4$, $LiSO_3CF_3$, $LiN(SO_2F)_2$, $LiN(SO_2CF_3)_2$, $LiBC_4O_8$, $Li[PF_3(C_2CF_5)_3]$, $LiC(SO_2CF_3)_3$, and a combination thereof. In some variations, the salt is $LiPF_6$.

In a fifth aspect, the electrolyte fluid can include a solvent selected from propylene carbonate (PC), ethylene carbonate (EC), dimethyl carbonate (DMC), diethyl carbonate (DEC), ethyl-methyl carbonate (EMC), ethyl propionate (EP), butyl butyrate (BB), methyl acetate (MA), methyl butyrate (MB), methyl propionate (MP), propylene carbonate (PC), ethyl acetate (EA), propyl propionate (PP), butyl propionate (BP), propyl acetate (PA), butyl acetate (BA), and a combination thereof. In some variations, the solvent is selected from PC, EC, PP, EP, and a combination thereof. In some variations, the solvent comprises PC, EC, PP, and EP.

In a sixth aspect, the electrolyte fluid includes an additive selected from lithium difluoro(oxalato)borate (LiDFOB), vinyl ethylene carbonate (VEC), propane sultone (PS), fluoroethylene carbonate (FEC), succinonitrile (SN), vinyl carbonate (VC), adiponitrile (ADN), ethyleneglycol bis(2-cyanoethyl)ether (EGPN), and/or 1,3,6-hexanetricarbonitrile (HTCN), and a combination thereof. In some variations, the additive is selected from PS, FEC, SN, HTCN, and a combination thereof. In some variations, the additive includes PS, FEC, SN, and HTCN.

In a seventh aspect, the disclosure is directed to a battery cell. The battery cell can include a cathode having a cathode active material disposed on a cathode current collector, and an anode having an anode active material disposed on an anode current collector. The anode is oriented towards the cathode such that the anode active material faces the cathode active material. A separator is disposed between the cathode active material and the anode active material. An electrolyte fluid as described herein is disposed between the cathode and anode.

BRIEF DESCRIPTION OF THE DRAWINGS

The disclosure will be readily understood by the following detailed description in conjunction with the accompanying drawings, wherein like reference numerals designate like structural elements, and in which:

FIG. 5 depicts lithium plating for three separate electrolyte fluids, in accordance with illustrative embodiments;

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Figure 1:
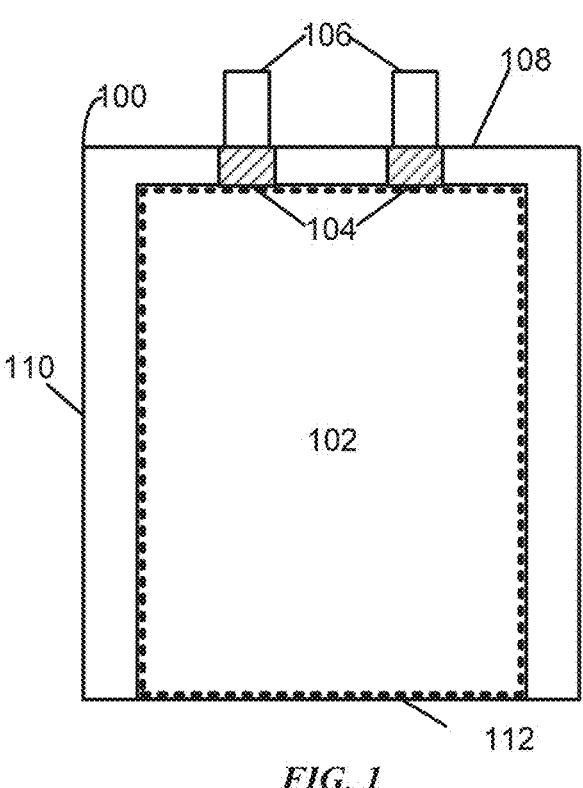
FIG. 1 is a top-down view of a battery cell, in accordance with an illustrative embodiment.

FIG. 1 presents a top-down view of a battery cell 100 in accordance with an illustrative embodiment. The battery cell 100 may correspond to a lithium-ion or lithium-polymer battery cell that is used to power a device used in a consumer, medical, aerospace, defense, and/or transportation application. The battery cell 100 includes a stack 102 containing a number of layers that include a cathode with a cathode active coating, a separator, and an anode with an anode active coating. More specifically, the stack 102 may include one strip of cathode active material (e.g., aluminum foil coated with a lithium compound) and one strip of anode active material (e.g., copper foil coated with carbon). The stack 102 also includes one strip of separator material (e.g., a microporous polymer membrane or non-woven fabric mat) disposed between the one strip of cathode active material and the one strip of anode active material. The cathode, anode, and separator layers may be left flat in a planar configuration or may be wrapped into a wound configuration (e.g., a "jelly roll"). An electrolyte solution is disposed between each cathode and anode.

During assembly of the battery cell 100, the stack 102 can be enclosed in a pouch or container. The stack 102 may be in a planar or wound configuration, although other configurations are possible. In some variations, the pouch such as a pouch formed by folding a flexible sheet along a fold line 112. In some instances, the flexible sheet is made of aluminum with a polymer film, such as polypropylene. After the flexible sheet is folded, the flexible sheet can be sealed, for example, by applying heat along a side seal 110 and along a terrace seal 108. The flexible pouch may be less than or equal to 120 microns thick to improve the packaging efficiency of the battery cell 100, the density of battery cell 100, or both.

The stack 102 can also include a set of conductive tabs 106 coupled to the cathode and the anode. The conductive tabs 106 may extend through seals in the pouch (for example, formed using sealing tape 104) to provide terminals for the battery cell 100. The conductive tabs 106 may then be used to electrically couple the battery cell 100 with one or more other battery cells to form a battery pack. For example, the battery pack may be formed by coupling battery cells in a series, parallel, or a series-and-parallel configuration. Such coupled cells may be enclosed in a hard case to complete the battery pack, or may be embedded within an enclosure of a portable electronic device, such as a laptop computer, tablet computer, mobile phone, personal digital assistant (PDA), digital camera, and/or portable media player.

Figure 2:
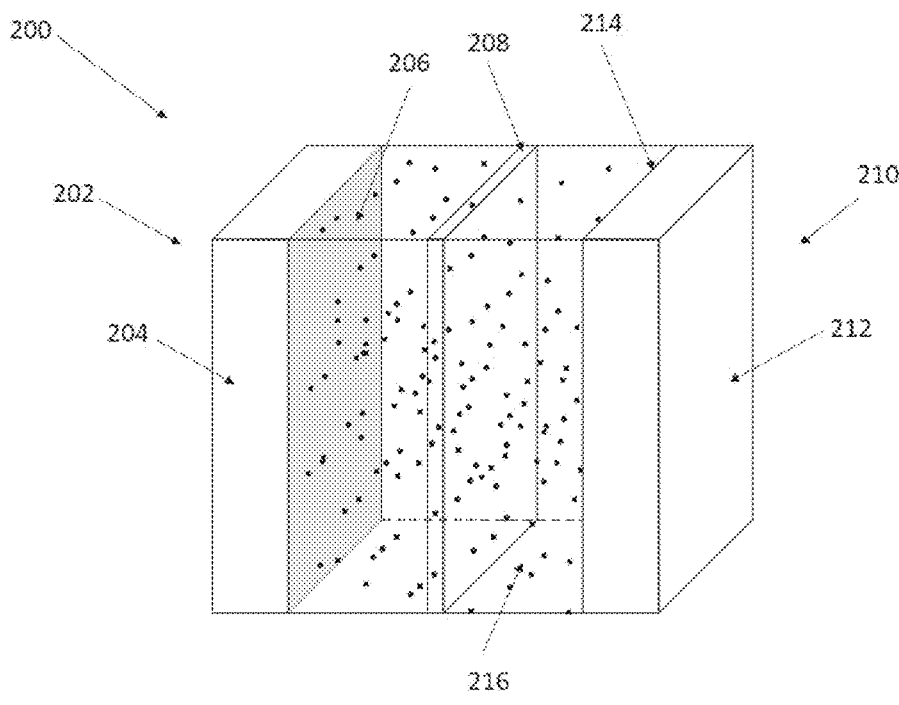
FIG. 2 is a perspective view of a battery cell, in accordance with an illustrative embodiment.

FIG. 2 presents a perspective view of battery cell 200 (e.g., the battery cell 100 of FIG. 1) in accordance with the disclosed illustrative embodiments. The battery includes a cathode 202 that includes current collector 204 and cathode active material 206 and anode 210 including anode current collector 212 and anode active material 214. Separator 208 is disposed between cathode 202 and anode 210. Electrolyte fluid 216 is disposed between cathode 202 and anode 210, and is in contact with separator 208. To create the battery cell, cathode 202, separator 208, and anode 210 may be stacked in a planar configuration, or stacked and then wrapped into a wound configuration. Electrolyte fluid 216 can then be added. Before assembly of the battery cell, the set of layers may correspond to a cell stack.

The cathode current collector, cathode active material, anode current collector, anode active material, and separator may be any material known in the art. In some variations, the cathode current collector may be an aluminum foil, the anode current collector may be a copper foil. The cathode active material can be any material described in, for example, Ser. No. 14/206,654, 15/458,604, 15/458,612, 15/709,961, 15/710,540, 15/804,186, 16/531,883, 16/529, 545, 16/999,307, 16/999,328, 16/999,265, each of which is incorporated herein by reference in its entirety.

The separator may include a microporous polymer membrane or non-woven fabric mat. Non-limiting examples of the microporous polymer membrane or non-woven fabric mat include microporous polymer membranes or non-woven fabric mats of polyethylene (PE), polypropylene (PP), polyamide (PA), polytetrafluoroethylene (PTFE), polyvinyl chloride (PVC), polyester, and polyvinylidene difluoride (Pad). However, other microporous polymer membranes or non-woven fabric mats are possible (e.g., gel polymer electrolytes).

In general, separators represent structures in a battery, such as interposed layers, that prevent physical contact of cathodes and anodes while allowing ions to transport therebetween. Separators are formed of materials having pores that provide channels for ion transport, which may include absorbing an electrolyte fluid that contains the ions. Materials for separators may be selected according to chemical stability, porosity, pore size, permeability, wettability, mechanical strength, dimensional stability, softening temperature, and thermal shrinkage. These parameters can influence battery performance and safety during operation.

In general, electrolyte fluid can act a conductive pathway for the movement of cations passing from the negative to the positive electrodes during discharge. The electrolyte fluid includes an electrolyte salt, electrolyte solvent, and one or more electrolyte additives.

The electrolyte fluid includes an electrolyte solvent. The electrolyte solvent may be any type of electrolyte solvent suitable for battery cells. Non-limiting examples of the electrolyte solvents include propylene carbonate (PC), ethylene carbonate (EC), dimethyl carbonate (DMC), diethyl carbonate (DEC), ethyl-methyl carbonate (EMC), ethyl propionate (EP), butyl butyrate (BB), methyl acetate (MA), methyl butyrate (MB), methyl propionate (MP), propylene carbonate (PC), ethyl acetate (EA), propyl propionate (PP), butyl propionate (BP), propyl acetate (PA), and butyl acetate (BA), or combinations thereof.

The electrolyte fluid also has one or more electrolyte salts dissolved therein. The salt may be any type of salt suitable for battery cells. For example, and without limitation, salts for a lithium-ion battery cell include $LiPF_6$, $LiBF_4$, $LiClO_4$, $LiSO_3CF_3$, $LiN(SO_2F)_2$, $LiN(SO_2CF_3)_2$, $LiBC_4O_8$, $Li[PF_3(C_2CF_5)_3]$, $LiC(SO_2CF_3)_3$, and any combinations thereof. Other salts are possible, including combinations of salts.

In some variations, the salt is at least 0.1 M in the total electrolyte fluid. In some variations, the salt is at least 0.2 M in the total electrolyte fluid. In some variations, the salt is at least 0.3 M in the total electrolyte fluid. In some variations, the salt is at least 0.4 M in the total electrolyte fluid. In some variations, the salt is at least 0.5 M in the total electrolyte fluid. In some variations, the salt is at least 0.6 M in the total electrolyte fluid. In some variations, the salt is at least 0.7 M in the total electrolyte fluid. In some variations, the salt is at least 0.8 M in the total electrolyte fluid. In some variations, the salt is at least 0.9 M in the total electrolyte fluid. In some variations, the salt is at least 1.0 M in the total electrolyte fluid. In some variations, the salt is at least 1.3 M in the total electrolyte fluid. In some variations, the salt is at least 1.6 M in the total electrolyte fluid. In some variations, the salt is at least 1.9 M in the total electrolyte fluid.

In some variations, the salt is less than or equal to 2.0 M in the electrolyte fluid. In some variations, the salt is less than or equal to 1.9 M in the electrolyte fluid. In some variations, the salt is less than or equal to 1.6 M in the electrolyte fluid. In some variations, the salt is less than or equal to 1.3 M in the electrolyte fluid. In some variations, the salt is less than or equal to 1.1 M in the electrolyte fluid. In some variations, the salt is less than or equal to 1.0 M in the electrolyte fluid. In some variations, the salt is less than or equal to 0.9 M in the electrolyte fluid. In some variations, the salt is less than or equal to 0.8 M in the electrolyte fluid. In some variations, the salt is less than or equal to 0.7 M in the electrolyte fluid. In some variations, the salt is less than or equal to 0.6 M in the electrolyte fluid. In some variations, the salt is less than or equal to 0.5 M in the electrolyte fluid. In some variations, the salt is less than or equal to 0.4 M in the electrolyte fluid. In some variations, the salt is less than or equal to 0.3 M in the electrolyte fluid. In some variations, the salt is less than or equal to 0.2 M in the electrolyte fluid.

TMSB, PES, and MMDS

In some variations, the electrolyte fluid can include the combination of additives TMSB, PES, and MMDS. The combination of the TMSB, PES, and MMDS additives in combination provides substantial improvements over what would be expected of the additives separately, or in different combinations.

The amount of each a TMSB, PES, and MMDS can be at least and/or less than or equal to different amounts in different combinations.

In some variations, TMSB is at least 0.1 wt % of the total electrolyte fluid. In some variations, TMSB is at least 0.2 wt % of the total electrolyte fluid. In some variations, TMSB is at least 0.3 wt % of the total electrolyte fluid. In some variations, TMSB is at least 0.4 wt % of the total electrolyte fluid. In some variations, TMSB is at least 0.5 wt % of the total electrolyte fluid. In some variations, TMSB is at least 0.6 wt % of the total electrolyte fluid. In some variations, TMSB is at least 0.7 wt % of the total electrolyte fluid. In some variations, TMSB is at least 0.8 wt % of the total electrolyte fluid. In some variations, TMSB is at least 0.9 wt % of the total electrolyte fluid. In some variations, TMSB is at least 1.0 wt % of the total electrolyte fluid. In some variations, TMSB is at least 1.3 wt % of the total electrolyte fluid. In some variations, TMSB is at least 1.6 wt % of the total electrolyte fluid. In some variations, TMSB is at least 1.9 wt % of the total electrolyte fluid.

In some variations, TMSB is less than or equal to 2.0 wt % of the total electrolyte fluid. In some variations, TMSB is less than or equal to 1.9 wt % of the total electrolyte fluid. In some variations, TMSB is less than or equal to 1.3 wt % of the total electrolyte fluid. In some variations, TMSB is less than or equal to 1.3 wt % of the total electrolyte fluid. In some variations, TMSB is less than or equal to 1.1 wt % of the total electrolyte fluid. In some variations, TMSB is less than or equal to 1.0 wt % of the total electrolyte fluid. In some variations, TMSB is less than or equal to 0.9 wt % of the total electrolyte fluid. In some variations, TMSB is less than or equal to 0.8 wt % of the total electrolyte fluid. In some variations, TMSB is less than or equal to 0.7 wt % of the total electrolyte fluid. In some variations, TMSB is less than or equal to 0.6 wt % of the total electrolyte fluid. In some variations, TMSB is less than or equal to 0.5 wt % of the total electrolyte fluid. In some variations, TMSB is less than or equal to 0.4 wt % of the total electrolyte fluid. In some variations, TMSB is less than or equal to 0.3 wt % of the total electrolyte fluid. In some variations, TMSB is less than or equal to 0.2 wt % of the total electrolyte fluid.

In some variations, the amount of PES is at least 0.5 wt % of the total electrolyte fluid. In some variations, the amount of PES is at least 0.6 wt % of the total electrolyte fluid. In some variations, the amount of PES is at least 0.9 wt % of the total electrolyte fluid. In some variations, the amount of PES is at least 1.3 wt % of the total electrolyte fluid. In some variations, the amount of PES is at least 1.6 wt % of the total electrolyte fluid. In some variations, the amount of PES is at least 1.9 wt % of the total electrolyte fluid. In some variations, the amount of PES is at least 2.2 wt % of the total electrolyte fluid. In some variations, the amount of PES is at least 2.5 wt % of the total electrolyte fluid. In some variations, the amount of PES is at least 2.8 wt % of the total electrolyte fluid. In some variations, the amount of PES is at least 3.0 wt % of the total electrolyte fluid.

In some variations, the amount of PES is less than or equal to 3.5 wt % of the total electrolyte fluid. In some variations, the amount of PES is less than or equal to 3.0 wt % of the total electrolyte fluid. In some variations, the amount of PES is less than or equal to 2.8 wt % of the total electrolyte fluid. In some variations, the amount of PES is less than or equal to 2.5 wt % of the total electrolyte fluid. In some variations, the amount of PES is less than or equal to 2.2 wt % of the total electrolyte fluid. In some variations, the amount of PES is less than or equal to 1.9 wt % of the total electrolyte fluid. In some variations, the amount of PES is less than or equal to 1.6 wt % of the total electrolyte fluid. In some variations, the amount of PES is less than or equal to 1.3 wt % of the total electrolyte fluid. In some variations, the amount of PES is less than or equal to 1.1 wt % of the total electrolyte fluid. In some variations, the amount of PES is less than or equal to 0.9 wt % of the total electrolyte fluid. In some variations, the amount of PES is less than or equal to 0.6 wt % of the total electrolyte fluid.

In some variations, the amount of MMDS is at least 0.1 wt % of the total electrolyte fluid. In some variations, the amount of MMDS is at least 0.2 wt % of the total electrolyte fluid. In some variations, the amount of MMDS is at least 0.3 wt % of the total electrolyte fluid. In some variations, the amount of MMDS is at least 0.4 wt % of the total electrolyte fluid. In some variations, the amount of MMDS is at least 0.5 wt % of the total electrolyte fluid. In some variations, the amount of MMDS is at least 0.6 wt % of the total electrolyte fluid. In some variations, the amount of MMDS is at least 0.7 wt % of the total electrolyte fluid. In some variations, the amount of MMDS is at least 0.8 wt % of the total electrolyte fluid. In some variations, the amount of MMDS is at least 0.9 wt % of the total electrolyte fluid. In some variations, the amount of MMDS is at least 1.0 wt % of the total electrolyte fluid. In some variations, the amount of MMDS is at least 1.1 wt % of the total electrolyte fluid. In some variations, the amount of MMDS is at least 1.2 wt % of the total electrolyte fluid. In some variations, the amount of MMDS is at least 1.3 wt % of the total electrolyte fluid. In some variations, the amount of MMDS is at least 1.4 wt % of the total electrolyte fluid.

In some variations, the amount of MMDS is less than or equal to 1.5 wt % of the total electrolyte fluid. In some variations, the amount of MMDS is less than or equal to 1.4 wt % of the total electrolyte fluid. In some variations, the amount of MMDS is less than or equal to 1.3 wt % of the total electrolyte fluid. In some variations, the amount of MMDS is less than or equal to 1.2 wt % of the total electrolyte fluid. In some variations, the amount of MMDS is less than or equal to 1.1 wt % of the total electrolyte fluid. In some variations, the amount of MMDS is less than or equal to 1.0 wt % of the total electrolyte fluid. In some variations, the amount of MMDS is less than or equal to 0.9 wt % of the total electrolyte fluid. In some variations, the amount of MMDS is less than or equal to 0.8 wt % of the total electrolyte fluid. In some variations, the amount of MMDS is less than or equal to 0.7 wt % of the total electrolyte fluid. In some variations, the amount of MMDS is less than or equal to 0.6 wt % of the total electrolyte fluid. In some variations, the amount of MMDS is less than or equal to 0.5 wt % of the total electrolyte fluid. In some variations, the amount of MMDS is less than or equal to 0.4 wt % of the total electrolyte fluid. In some variations, the amount of MMDS is less than or equal to 0.3 wt % of the total electrolyte fluid. In some variations, the amount of MMDS is less than or equal to 0.2 wt % of the total electrolyte fluid.

TMSB, FEC, BS and PES

In other variations, the electrolyte fluid includes TMSB, FEC, BS, and PES.

TMSB can be in any amount as described herein. Likewise, PES can be in any amount as described herein. MMDS can optionally be added in any amount described herein.

In some variations, FEC provides for improved high temperature storage performance (e.g., at 85° C. for 8 hours) by, for example, reducing gas generation. In some variations, FEC can improve high temperature performance and passivate the anode surface (i.e., forming an SEI). In some variations, the amount of FEC is at least 0.5 wt % of the total electrolyte fluid. In some variations, the amount of FEC is at least 1.5 wt % of the total electrolyte fluid. In some variations, the amount of FEC is at least 2.0 wt % of the total electrolyte fluid. In some variations, the amount of FEC is at least 2.5 wt % of the total electrolyte fluid. In some variations, the amount of FEC is at least 3.0 wt % of the total electrolyte fluid. In some variations, the amount of FEC is at least 3.5 wt % of the total electrolyte fluid. In some variations, the amount of FEC is at least 4.0 wt % of the total electrolyte fluid. In some variations, the amount of FEC is at least 4.5 wt % of the total electrolyte fluid. In some variations, the amount of FEC is at least 5.0 wt % of the total electrolyte fluid. In some variations, the amount of FEC is at least 5.5 wt % of the total electrolyte fluid. In some variations, the amount of FEC is at least 6.5 wt % of the total electrolyte fluid. In some variations, the amount of FEC is at least 7.0 wt % of the total electrolyte fluid. In some variations, the amount of FEC is at least 7.5 wt % of the total electrolyte fluid. In some variations, the amount of FEC is at least 8.0 wt % of the total electrolyte fluid. In some variations, the amount of FEC is at least 8.5 wt % of the total electrolyte fluid. In some variations, the amount of FEC is at least 9.0 wt % of the total electrolyte fluid. In some variations, the amount of FEC is at least 9.5 wt % of the total electrolyte fluid. In some variations, the amount of FEC is at least 10.0 wt % of the total electrolyte fluid. In some variations, the amount of FEC is at least 10.5 wt % of the total electrolyte fluid. In some variations, the amount of FEC is at least 11.0 wt % of the total electrolyte fluid. In some variations, the amount of FEC is at least 11.5 wt % of the total electrolyte fluid.

In some variations, the amount of FEC is less than or equal to 12.0 wt % of the total electrolyte fluid. In some variations, the amount of FEC is less than or equal to 11.5 wt % of the total electrolyte fluid. In some variations, the amount of FEC is less than or equal to 11.0 wt % of the total electrolyte fluid. In some variations, the amount of FEC is less than or equal to 10.5 wt % of the total electrolyte fluid. In some variations, the amount of FEC is less than or equal to 10.0 wt % of the total electrolyte fluid. In some variations, the amount of FEC is less than or equal to 9.5 wt % of the total electrolyte fluid. In some variations, the amount of FEC is less than or equal to 9.0 wt % of the total electrolyte fluid. In some variations, the amount of FEC is less than or equal to 8.5 wt % of the total electrolyte fluid. In some variations, the amount of FEC is less than or equal to 8.0 wt % of the total electrolyte fluid. In some variations, the amount of FEC is less than or equal to 7.5 wt % of the total electrolyte fluid. In some variations, the amount of FEC is less than or equal to 7.0 wt % of the total electrolyte fluid. In some variations, the amount of FEC is less than or equal to 6.5 wt % of the total electrolyte fluid. In some variations, the amount of FEC is less than or equal to 6.0 wt % of the total electrolyte fluid. In some variations, the amount of FEC is less than or equal to 5.5 wt % of the total electrolyte fluid. In some variations, the amount of FEC is less than or equal to 5.0 wt % of the total electrolyte fluid. In some variations, the amount of FEC is less than or equal to 4.5 wt % of the total electrolyte fluid. In some variations, the amount of FEC is less than or equal to 4.0 wt % of the total electrolyte fluid. In some variations, the amount of FEC is less than or equal to 3.5 wt % of the total electrolyte fluid. In some variations, the amount of FEC is less than or equal to 3.0 wt % of the total electrolyte fluid. In some variations, the amount of FEC is less than or equal to 2.5 wt % of the total electrolyte fluid. In some variations, the amount of FEC is less than or equal to 2.0 wt % of the total electrolyte fluid. In some variations, the amount of FEC is less than or equal to 1.5 wt % of the total electrolyte fluid. In some variations, the amount of FEC is less than or equal to 1.0 wt % of the total electrolyte fluid.

BS can be used to replace PS. PS has a relatively high internal resistance, as well as higher toxicity. By replacing PS with BS, the initial resistance is reduced. BS additionally releases less energy than PS upon degradation. The initial resistance of the battery with an electrolyte including BS is lower than the battery using an electrolyte containing PS. With BS, the increase in resistance over cycle times is relatively low. Further, electrolytes without PS have lower toxicity.

In some variations, the amount of BS is at least 0.5 wt % of the total electrolyte fluid. In some variations, the amount of BS is at least 1.0 wt % of the total electrolyte fluid. In some variations, the amount of BS is at least 1.5 wt % of the total electrolyte fluid. In some variations, the amount of BS is at least 2.0 wt % of the total electrolyte fluid. In some variations, the amount of BS is at least 2.5 wt % of the total electrolyte fluid. In some variations, the amount of BS is at least 3.0 wt % of the total electrolyte fluid. In some variations, the amount of BS is at least 3.5 wt % of the total electrolyte fluid. In some variations, the amount of BS is at least 4.0 wt % of the total electrolyte fluid. In some variations, the amount of BS is at least 4.5 wt % of the total electrolyte fluid. In some variations, the amount of BS is at least 5.0 wt % of the total electrolyte fluid. In some variations, the amount of BS is at least 5.5 wt % of the total electrolyte fluid.

In some variations, the amount of BS is less than or equal to 6.0 wt % of the total electrolyte fluid. In some variations, the amount of BS is less than or equal to 5.5 wt % of the total electrolyte fluid. In some variations, the amount of BS is less than or equal to 5.0 wt % of the total electrolyte fluid. In some variations, the amount of BS is less than or equal to 4.5 wt % of the total electrolyte fluid. In some variations, the amount of BS is less than or equal to 4.0 wt % of the total electrolyte fluid. In some variations, the amount of BS is less than or equal to 3.5 wt % of the total electrolyte fluid. In some variations, the amount of BS is less than or equal to 3.0 wt % of the total electrolyte fluid. In some variations, the amount of BS is less than or equal to 2.5 wt % of the total electrolyte fluid. In some variations, the amount of BS is less than or equal to 2.0 wt % of the total electrolyte fluid. In some variations, the amount of BS is less than or equal to 1.5 wt % of the total electrolyte fluid. In some variations, the amount of BS is less than or equal to 1.0 wt % of the total electrolyte fluid.

TMSB, FEC, PS, and LiBF$_4$

In some variations, the electrolyte fluid can include TMSB, FEC, PS, and LiBF$_4$. TMSB can be in any amount as described herein. FEC can be in any amount described herein. Likewise, PS can be in any amount as described herein. MMDS can be added in any amount described herein.

In some variations, the amount of LiBF$_4$ is at least 0.01 wt % of the total electrolyte fluid. In some variations, the amount of LiBF$_4$ is at least 0.05 wt % of the total electrolyte fluid. In some variations, the amount of LiBF$_4$ is at least 0.10 wt % of the total electrolyte fluid. In some variations, the amount of LiBF$_4$ is at least 0.15 wt % of the total electrolyte fluid. In some variations, the amount of LiBF$_4$ is less than or equal to 0.50 wt % of the total electrolyte fluid. In some variations, the amount of LiBF$_4$ is less than or equal to 0.40 wt % of the total electrolyte fluid. In some variations, the amount of LiBF$_4$ is less than or equal to 0.30 wt % of the total electrolyte fluid. In some variations, the amount of LiBF$_4$ is less than or equal to 0.2.5 wt % of the total electrolyte fluid.

In further variations, the electrolyte fluid can include additional additives. The additives can be selected from lithium difluoro(oxalato)borate (LiDFOB), vinyl ethylene carbonate (VEC), propane sultone (PS), fluoroethylene carbonate (FEC), succinonitrile (SN), vinyl carbonate (VC), adiponitrile (ADN), ethyleneglycol bis(2-cyanoethyl)ether (EGPN), and/or 1,3,6-hexanetricarbonitrile (HTCN), and a combination thereof.

In some variations, the electrolyte fluid can include LiD-FOB. LiDFOB is at least 0.1 wt % of the total electrolyte fluid. In some variations, LiDFOB is at least 0.2 wt % of the total electrolyte fluid. In some variations, LiDFOB is at least 0.3 wt % of the total electrolyte fluid. In some variations, LiDFOB is at least 0.4 wt % of the total electrolyte fluid. In some variations, LiDFOB is at least 0.5 wt % of the total electrolyte fluid. In some variations, LiDFOB is at least 0.6 wt % of the total electrolyte fluid. In some variations, LiDFOB is at least 0.7 wt % of the total electrolyte fluid. In some variations, LiDFOB is at least 0.8 wt % of the total electrolyte fluid. In some variations, LiDFOB is at least 0.9 wt % of the total electrolyte fluid. In some variations, LiDFOB is at least 1.0 wt % of the total electrolyte fluid. In some variations, LiDFOB is at least 1.3 wt % of the total electrolyte fluid. In some variations, LiDFOB is at least 1.6 wt % of the total electrolyte fluid. In some variations, LiDFOB is at least 1.9 wt % of the total electrolyte fluid.

In some variations, LiDFOB is less than or equal to 2.0 wt % of the total electrolyte fluid. In some variations, LiDFOB is less than or equal to 1.9 wt % of the total electrolyte fluid. In some variations, LiDFOB is less than or equal to 1.3 wt % of the total electrolyte fluid. In some variations, LiDFOB is less than or equal to 1.1 wt % of the total electrolyte fluid. In some variations, LiDFOB is less than or equal to 1.0 wt % of the total electrolyte fluid. In some variations, LiDFOB is less than or equal to 0.9 wt % of the total electrolyte fluid. In some variations, LiDFOB is less than or equal to 0.8 wt % of the total electrolyte fluid. In some variations, LiDFOB is less than or equal to 0.7 wt % of the total electrolyte fluid. In some variations, LiDFOB is less than or equal to 0.6 wt % of the total electrolyte fluid. In some variations, LiDFOB is less than or equal to 0.5 wt % of the total electrolyte fluid. In some variations, LiDFOB is less than or equal to 0.4 wt % of the total electrolyte fluid. In some variations, LiDFOB is less than or equal to 0.3 wt % of the total electrolyte fluid. In some variations, LiDFOB is less than or equal to 0.2 wt % of the total electrolyte fluid.

In some variations, the amount of VEC is at least 0.1 wt % of the total electrolyte fluid. In some variations, the amount of VEC is at least 0.2 wt % of the total electrolyte fluid. In some variations, the amount of VEC is at least 0.3 wt % of the total electrolyte fluid. In some variations, the amount of VEC is at least 0.4 wt % of the total electrolyte fluid. In some variations, the amount of VEC is at least 0.5 wt % of the total electrolyte fluid. In some variations, the amount of VEC is at least 0.6 wt % of the total electrolyte fluid. In some variations, the amount of VEC is at least 0.7 wt % of the total electrolyte fluid. In some variations, the amount of VEC is at least 0.8 wt % of the total electrolyte fluid. In some variations, the amount of VEC is at least 0.9 wt % of the total electrolyte fluid.

In some variations, the amount of VEC is less than or equal to 0.9 wt % of the total electrolyte fluid. In some variations, the amount of VEC is less than or equal to 0.8 wt % of the total electrolyte fluid. In some variations, the amount of VEC is less than or equal to 0.7 wt % of the total electrolyte fluid. In some variations, the amount of VEC is less than or equal to 0.6 wt % of the total electrolyte fluid. In some variations, the amount of VEC is less than or equal to 0.5 wt % of the total electrolyte fluid. In some variations, the amount of VEC is less than or equal to 0.4 wt % of the total electrolyte fluid. In some variations, the amount of VEC is less than or equal to 0.3 wt % of the total electrolyte fluid. In some variations, the amount of VEC is less than or equal to 0.2 wt % of the total electrolyte fluid.

In some variations, the amount of FEC is at least 2 wt % of the total electrolyte fluid. In some variations, the amount of FEC is at least 4 wt % of the total electrolyte fluid. In some variations, the amount of FEC is at least 6 wt % of the total electrolyte fluid. In some variations, the amount of FEC is at least 8 wt % of the total electrolyte fluid. In some variations, the amount of FEC is less than or equal to 10 wt % of the total electrolyte fluid. In some variations, the amount of FEC is less than or equal to 8 wt % of the total electrolyte fluid. In some variations, the amount of FEC is less than or equal to 6 wt % of the total electrolyte fluid. In some variations, the amount of FEC is less than or equal to 4 wt % of the total electrolyte fluid.

In some variations, the amount of PS is at least 0.5 wt % of the total electrolyte fluid. In some variations, the amount of PS is at least 1.0 wt % of the total electrolyte fluid. In some variations, the amount of PS is at least 1.5 wt % of the total electrolyte fluid. In some variations, the amount of PS is at least 2.0 wt % of the total electrolyte fluid. In some variations, the amount of PS is at least 2.5 wt % of the total electrolyte fluid. In some variations, the amount of PS is at least 3.0 wt % of the total electrolyte fluid. In some variations, the amount of PS is at least 3.5 wt % of the total electrolyte fluid. In some variations, the amount of PS is at least 4.0 wt % of the total electrolyte fluid. In some variations, the amount of PS is at least 4.5 wt % of the total electrolyte fluid. In some variations, the amount of PS is at least 5.0 wt % of the total electrolyte fluid.

In some variations, the amount of PS is less than or equal to 6.0 wt % of the total electrolyte fluid. In some variations, the amount of PS is less than or equal to 5.5 wt % of the total electrolyte fluid. In some variations, the amount of PS is less than or equal to 5.0 wt % of the total electrolyte fluid. In some variations, the amount of PS is less than or equal to 4.5 wt % of the total electrolyte fluid. In some variations, the amount of PS is less than or equal to 4.0 wt % of the total electrolyte fluid. In some variations, the amount of PS is less than or equal to 3.5 wt % of the total electrolyte fluid. In some variations, the amount of PS is less than or equal to 3.0 wt % of the total electrolyte fluid. In some variations, the amount of PS is less than or equal to 2.5 wt % of the total electrolyte fluid. In some variations, the amount of PS is less than or equal to 2.0 wt % of the total electrolyte fluid. In some variations, the amount of PS is less than or equal to 1.5 wt % of the total electrolyte fluid. In some variations, the amount of PS is less than or equal to 1.0 wt % of the total electrolyte fluid.

In some variations, the amount of SN is at least 0.5 wt % of the total electrolyte fluid. In some variations, the amount of SN is at least 1.0 wt % of the total electrolyte fluid. In some variations, the amount of SN is at least 1.5 wt % of the total electrolyte fluid. In some variations, the amount of SN is at least 2.0 wt % of the total electrolyte fluid. In some variations, the amount of SN is at least 2.5 wt % of the total electrolyte fluid. In some variations, the amount of SN is at least 3.0 wt % of the total electrolyte fluid. In some variations, the amount of SN is at least 3.5 wt % of the total electrolyte fluid. In some variations, the amount of SN is at least 4.0 wt % of the total electrolyte fluid. In some variations, the amount of SN is at least 4.5 wt % of the total electrolyte fluid. In some variations, the amount of SN is at least 5.0 wt % of the total electrolyte fluid.

In some variations, the amount of SN is less than or equal to 6.0 wt % of the total electrolyte fluid. In some variations, the amount of SN is less than or equal to 5.5 wt % of the total electrolyte fluid. In some variations, the amount of SN is less than or equal to 5.0 wt % of the total electrolyte fluid. In some variations, the amount of SN is less than or equal to 4.5 wt % of the total electrolyte fluid. In some variations, the amount of SN is less than or equal to 4.0 wt % of the total electrolyte fluid. In some variations, the amount of SN is less than or equal to 3.5 wt % of the total electrolyte fluid. In some variations, the amount of SN is less than or equal to 3.0 wt % of the total electrolyte fluid. In some variations, the amount of SN is less than or equal to 2.5 wt % of the total electrolyte fluid. In some variations, the amount of SN is less than or equal to 2.0 wt % of the total electrolyte fluid. In some variations, the amount of SN is less than or equal to 1.5 wt % of the total electrolyte fluid. In some variations, the amount of SN is less than or equal to 1.0 wt % of the total electrolyte fluid.

In some variations, the amount of HTCN is at least 0.5 wt % of the total electrolyte fluid. In some variations, the amount of HTCN is at least 1.0 wt % of the total electrolyte fluid. In some variations, the amount of HTCN is at least 1.5 wt % of the total electrolyte fluid. In some variations, the amount of HTCN is at least 2.0 wt % of the total electrolyte fluid. In some variations, the amount of HTCN is at least 2.5 wt % of the total electrolyte fluid. In some variations, the amount of HTCN is at least 3.0 wt % of the total electrolyte fluid. In some variations, the amount of HTCN is at least 3.5 wt % of the total electrolyte fluid. In some variations, the amount of HTCN is at least 4.0 wt % of the total electrolyte fluid. In some variations, the amount of HTCN is at least 4.5 wt % of the total electrolyte fluid. In some variations, the amount of HTCN is at least 5.0 wt % of the total electrolyte fluid.

In some variations, the amount of HTCN is less than or equal to 6.0 wt % of the total electrolyte fluid. In some variations, the amount of HTCN is less than or equal to 5.5 wt % of the total electrolyte fluid. In some variations, the amount of HTCN is less than or equal to 5.0 wt % of the total electrolyte fluid. In some variations, the amount of HTCN is less than or equal to 4.5 wt % of the total electrolyte fluid. In some variations, the amount of HTCN is less than or equal to 4.0 wt % of the total electrolyte fluid. In some variations, the amount of HTCN is less than or equal to 3.5 wt % of the total electrolyte fluid. In some variations, the amount of HTCN is less than or equal to 3.0 wt % of the total electrolyte fluid. In some variations, the amount of HTCN is less than or equal to 2.5 wt % of the total electrolyte fluid. In some variations, the amount of HTCN is less than or equal to 2.0 wt % of the total electrolyte fluid. In some variations, the amount of HTCN is less than or equal to 1.5 wt % of the total electrolyte fluid. In some variations, the amount of HTCN is less than or equal to 1.0 wt % of the total electrolyte fluid.

EXAMPLES

The Examples are provided for illustration purposes only. These examples are not intended to constrain any embodiment disclosed herein to any application or theory of operation.

Example 1

Table 1 shows a series of electrolyte compositions. The electrolyte fluids in the Examples correspond to the electrolyte fluid numbers in Table 1.

TABLE 1

| Electrolyte Fluid Number | Salt and Solvent | Additives wt % | | | | | | | | | | |
|---|---|---|---|---|---|---|---|---|---|---|---|---|
| | | LiDFOB | PS | BS | PES | MMDS | TMSB | FEC | LiBF₄ | SN | HTCN | VEC |
| 1 | 1.2M LiPF₆ | 0.5 | 4 | 0 | 0 | 0 | 0 | 7 | 0 | 2 | 3 | 0 |
| 2 | EC/PC/PP/ | 0.7 | 2.5 | 0 | 1.5 | 0.5 | 0 | 7 | 0 | 2 | 3 | 0 |
| 3 | EP = | 0.7 | 2.5 | 0 | 1.5 | 0.5 | 0.5 | 7 | 0 | 2 | 3 | 0 |
| 4 | 20/10/25/45 | 0.7 | 0 | 3.5 | 0.2 | 0.5 | 0.2 | 4 | 0 | 2 | 3 | 0 |
| 5 | | 0.7 | 3.5 | 0 | 0 | 0.5 | 0.5 | 4 | 0.2 | 2 | 3 | 0 |
| 6 | | 0.5 | 4 | 0 | 0 | 0 | 0 | | 0 | 4 | 3 | 0.5 |

Figure 3A:
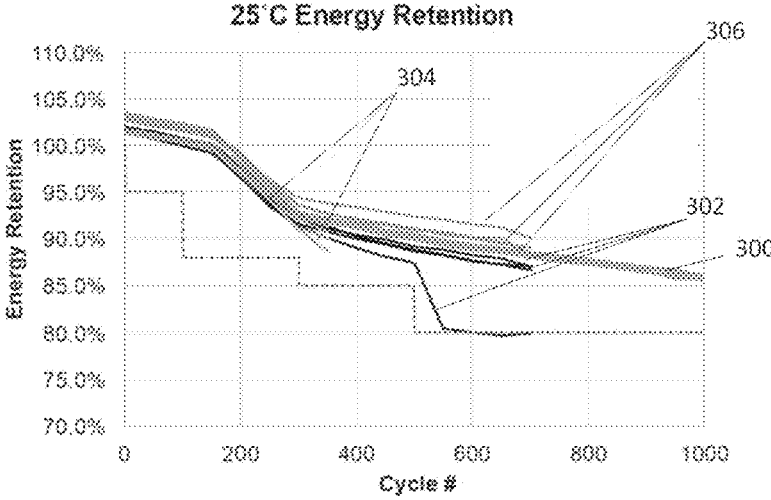
FIG. 3A depicts a plot of energy retention as a function of cycle number for Li-ion batteries at 25° C. with electrolyte fluid additives LiDFOB and PS (302), LIDFOB, PS, PES, and MMDS (304), LIDFOB, PS, PES, MMDS, and TMSB (306), in accordance with illustrative embodiments.
Figure 3B:
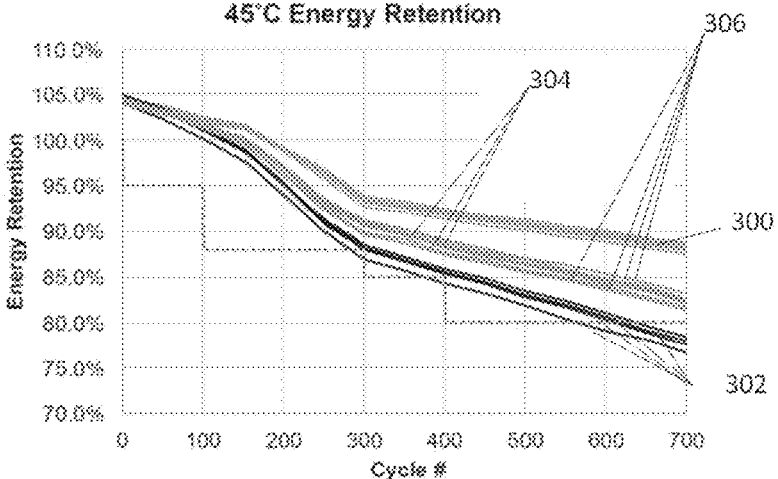
FIG. 3B depicts a plot of energy retention as a function of cycle number for Li-ion batteries at 45° C. with electrolyte fluid additives LIDFOB and PS (302), LiDFOB, PS, PES, and MMDS (304), LIDFOB, PS, PES, MMDS, and TMSB (306), in accordance with illustrative embodiments.

FIG. 3A depicts a plot of the energy retention as a function of cycle number for Li-ion batteries at 25° C. normalized to 4.50 V. With reference to Table 1, the energy retention as a function of cycle number was measured for Electrolyte Fluid 1 including LIDFOB and PS (302), Electrolyte Fluid 2 including LiDFOB, PS, PES, and MMDS (304), and Electrolyte Fluid 3 including LiDFOB, PS, PES, MMDS, and TMSB (306). Electrolyte Fluids 1 and 3 were measured over 700 cycles, while Electrolyte Fluid 2 was measured over 350 cycles. Control (300) did not contain the additives. Electrolyte Fluid 3, which included TMSB, had higher energy retention as a function of cycle number included TMSB. Electrolyte Fluids 2 and 3, which both lacked TMSB, had lower energy retention as a function of cycle number. Likewise, FIG. 3B depicts a plot of the energy retention as a function of cycle number for Li-ion batteries at 45° C. With reference to Table 1, the energy retention as a function of cycle number was measured over 700 cycles for Electrolyte Fluid 1 including LiDFOB and PS (302), Electrolyte Fluid 2 including LiDFOB, PS, PES, and MMDS (304), and Electrolyte Fluid 3 including LiDFOB, PS, PES, MMDS, and TMSB (306). Electrolyte Fluids 2 and 3 had higher energy retention as a function of cycle number than Electrolyte fluid 1, as well as the control (300).

Figure 3C:
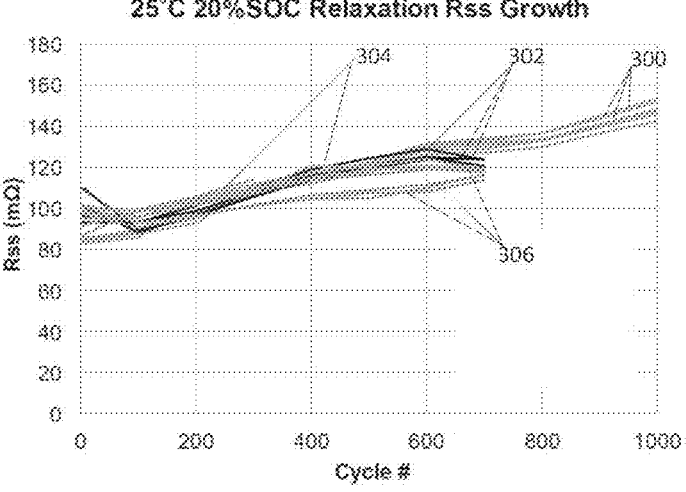
FIG. 3C depicts a plot of relaxation RSS growth as a function of cycle number for Li-ion batteries at 20% state of charge (SOC) at 25° C. with electrolyte fluid additives LiDFOB and PS (302), LIDFOB, PS, PES, and MMDS (304), LIDFOB, PS, PES, MMDS, and TMSB (306), in accordance with illustrative embodiments.

FIG. 3C depicts a plot of relaxation RSS growth as a function of cycle number for Li-ion batteries at 20% state of charge (SOC) at 25° C. for Electrolyte Fluids 1, 2, and 3 over 700 cycles. Electrolyte Fluid 1 includes LIDFOB and PS (302), Electrolyte Fluid 2 includes LiDFOB, PS, PES, and MMDS (304), and Electrolyte Fluid 3 includes LIDFOB, PS, PES, MMDS, and TMSB (306). Control (300) did not contain the additives. Electrolyte Fluid 3 (306), which had the lowest RSS as a function of cycle count, was the only electrolyte fluid tested to include TMSB. Electrolyte Fluid 2 (304) had the second lowest RSS as a function of cycle count included both TMSB and MMDS. All Electrolyte Fluids 302, 304, and 306 had an RSS lower than control Electrolyte Fluid 300.

Figure 3D:
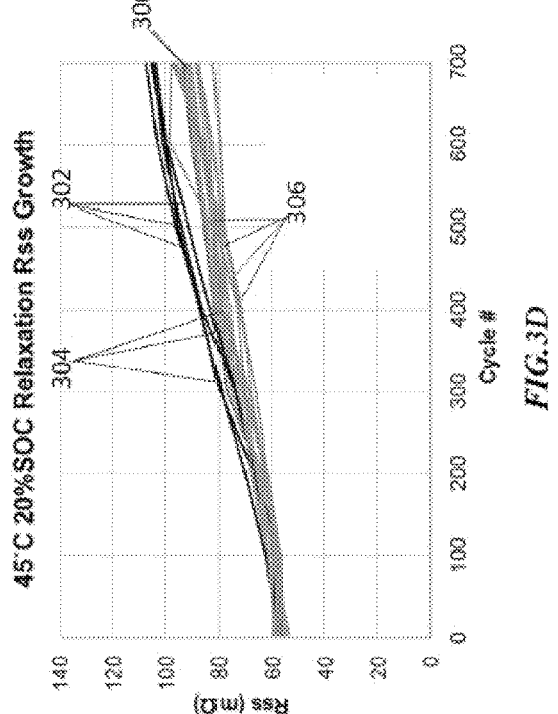
FIG. 3D depicts a plot of 20% SOC relaxation RSS growth as a function of cycle number for Li-ion batteries at 20% charge and 45° C. with electrolyte fluid additives LIDFOB and PS (302), LiDFOB, PS, PES, and MMDS (304), LiDFOB, PS, PES, MMDS, and TMSB (306), in accordance with illustrative embodiments.

FIG. 3D depicts a plot of relaxation RSS growth as a function of cycle number for Li-ion batteries at 20% state of charge (SOC) at 45° C. for Electrolyte Fluids 1, 2, and 3 over 700 cycles. Electrolyte Fluid 1 includes LIDFOB and PS (302), Electrolyte Fluid 2 includes LIDFOB, PS, PES, and MMDS (304), and Electrolyte Fluid 3 includes LIDFOB, PS, PES, MMDS, and TMSB (306). Control (300) did not contain the additives. Electrolyte Fluid 3 (306), which had the lowest RSS as a function of cycle count, was the only electrolyte fluid tested to include TMSB. Electrolyte Fluid 2 (304) had the second lowest RSS as a function of cycle count included both TMSB and MMDS. All Electrolyte Fluids 302, 304, and 306 had an RSS lower than control Electrolyte Fluid 300.

Electrolyte 3, which contained TMSB, showed enhanced performance at 25° C. and 45° C. with minimum impedance growth. The combination of TMBS, MMDS, and PES provided a synergetic effect. Without wishing to be limited to a particular mechanism or theory, PES contributed to formation of a resilient passivation layer (i.e., solid electrolyte interface (SEI)) on the graphite anode. MMDS contributed to passivation at both the cathode and anode. TMSB acts as a hydrogen fluoride (HF) scavenger, mitigating the transition metal dissolution by reacting with HF. At 25° C. the lower RSS of TMSB-containing electrolyte fluids contributes to reducing internal resistance and improve the energy retention. At 45° C. MMDS-containing electrolyte fluids show improved energy retention and lower RSS growth.

Example 2

Figure 4:
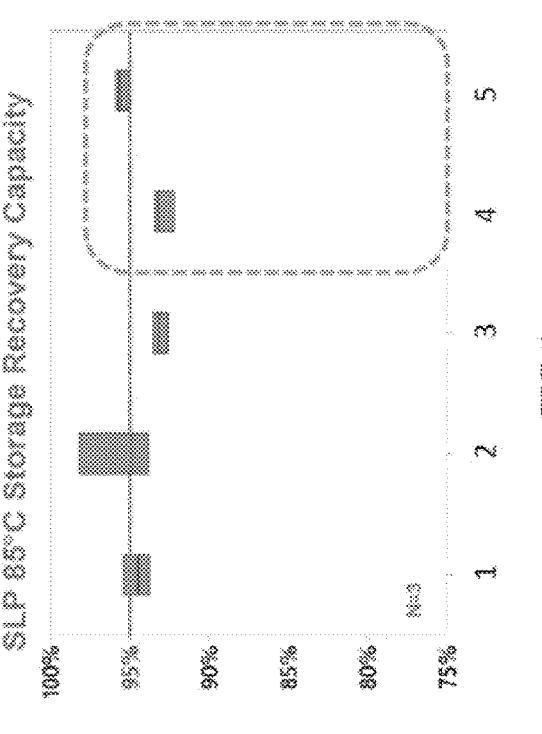
FIG. 4 depicts the storage recovery capacity of single layer pouch (SLP) cells after storage for 8 hours at 85° C. for different combinations of electrolyte fluid additives, in accordance with illustrative embodiments.

FIG. 4 depicts the storage recovery capacity after 85° C. storage for SLP cells with various electrolyte fluids having different additive combinations. Electrolyte Fluid 1 does not include any tested additives. Electrolyte Fluid 2 included 1.5 wt % PES, 2.5 wt % PS, and 7 wt % FEC. Electrolyte Fluid 3 included 1.5 wt % PES, 2.5 wt % PS, 0.5 wt % TMSB, and 7 wt % FEC. Electrolyte Fluid 4 included 0.2 wt % PES, 3.5 wt % BS, 0.2 wt % TMSB, and 4 wt % FEC. Electrolyte Fluid 5 includes no PES, 3.5 wt % PS, 0.5 wt % TMSB, 0.2 wt % LiBF₄, and 4 wt % FEC.

With respect to FIG. 4, after 8 hours storage at 85° C. while fully charged, the recovery capacity of battery cells containing different electrolyte combinations were measured. Electrolyte Fluids 4 and 5 contained different combinations of PES/TMSB concentration. Electrolyte Fluid 3 showed improved cycle time. By reducing the PES from 1.5% (Electrolyte Fluid 3) to 0.2 wt % (Electrolyte Fluid 4) or 0 wt % (Electrolyte Fluid 5), the recovery capacity was either sustained or improved.

Figure 5:
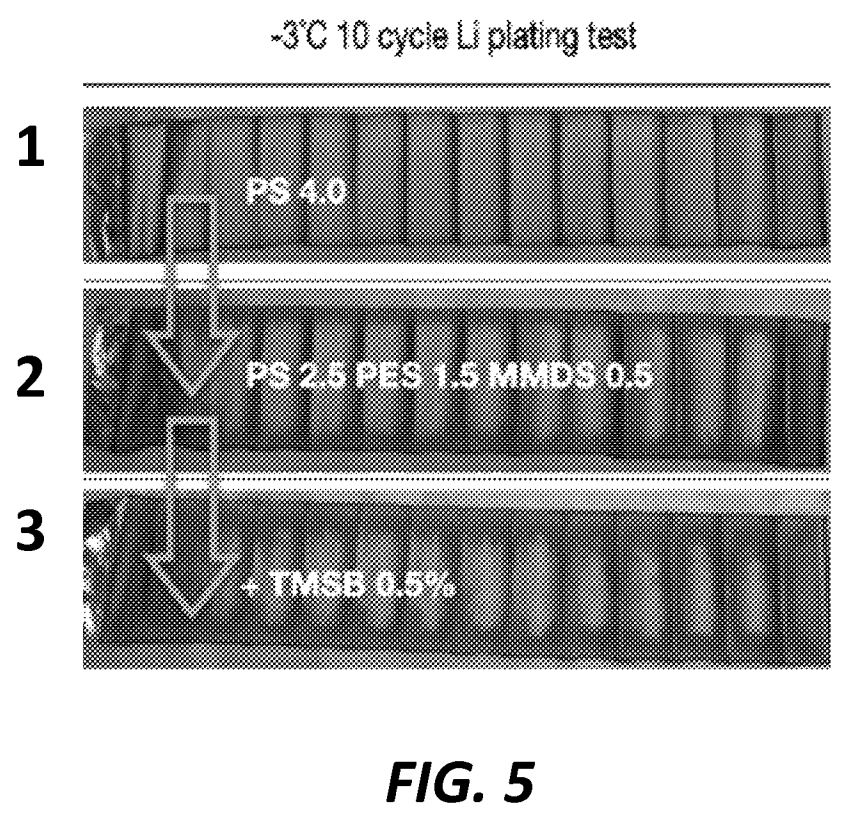

With respect to FIG. 5, PES and MMDS increase anode resistance. At room temperature, lithium ion mobility was reduced and the lithium plating area was increased. On addition of TMSB, the lithium plating area was reduced.

Figure 6:
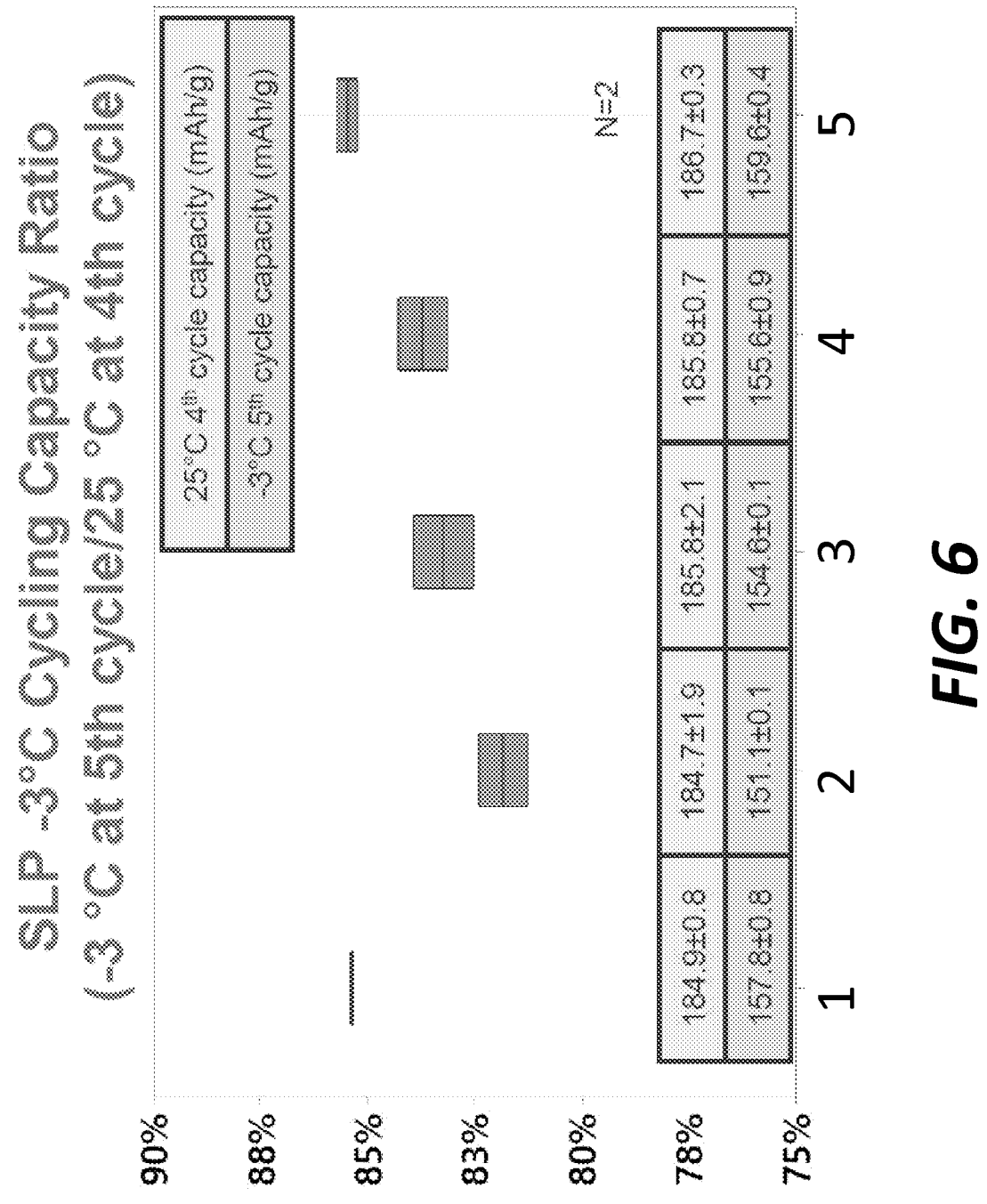
FIG. 6 depicts the cycling capacity ratio for five different electrolyte fluids in SLP cells at the fifth cycle at −3° C. and fourth cycle at 25° C., in accordance with illustrative embodiments.

FIG. 6 shows ion mobility of different combinations of electrolytes. The ion mobility increased upon elimination of PES and addition of LiBF₄. The largest improvement of the storage recovery capacity (with reference to FIG. 4) and ion mobility (with reference to FIG. 6) resulted in elimination of PES, addition of TMSB, and addition of LiBF₄. As PS reduced from 1.5 wt % to 0.5 wt % or 0 wt %, lithium plating was also reduced.

Figure 7:
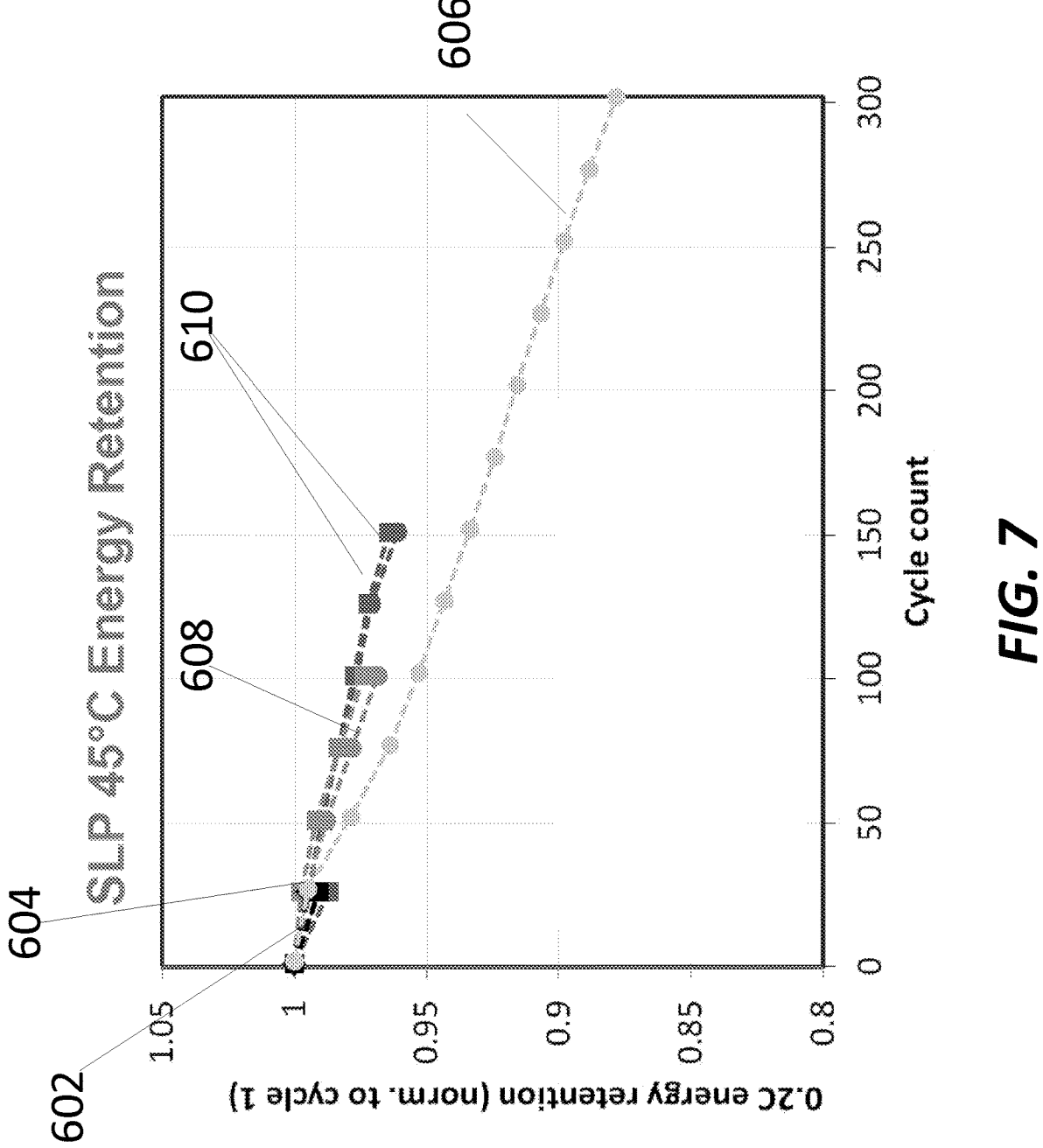
FIG. 7 depicts the energy retention of an SLP cell at 45° C. with different combinations of electrolyte additives, in accordance with illustrative embodiments.

FIG. 7 depicts a plot of the energy retention as a function of cycle number for Li-ion batteries at 45° C. With reference to Table 1, the energy retention as a function of cycle number was measured over for Electrolyte Fluid 2 (602), Electrolyte Fluid 3 (604), Electrolyte Fluid 6 (606), Electrolyte Fluid 5 (608), and Electrolyte Fluid 4 (610).

Figure 8:
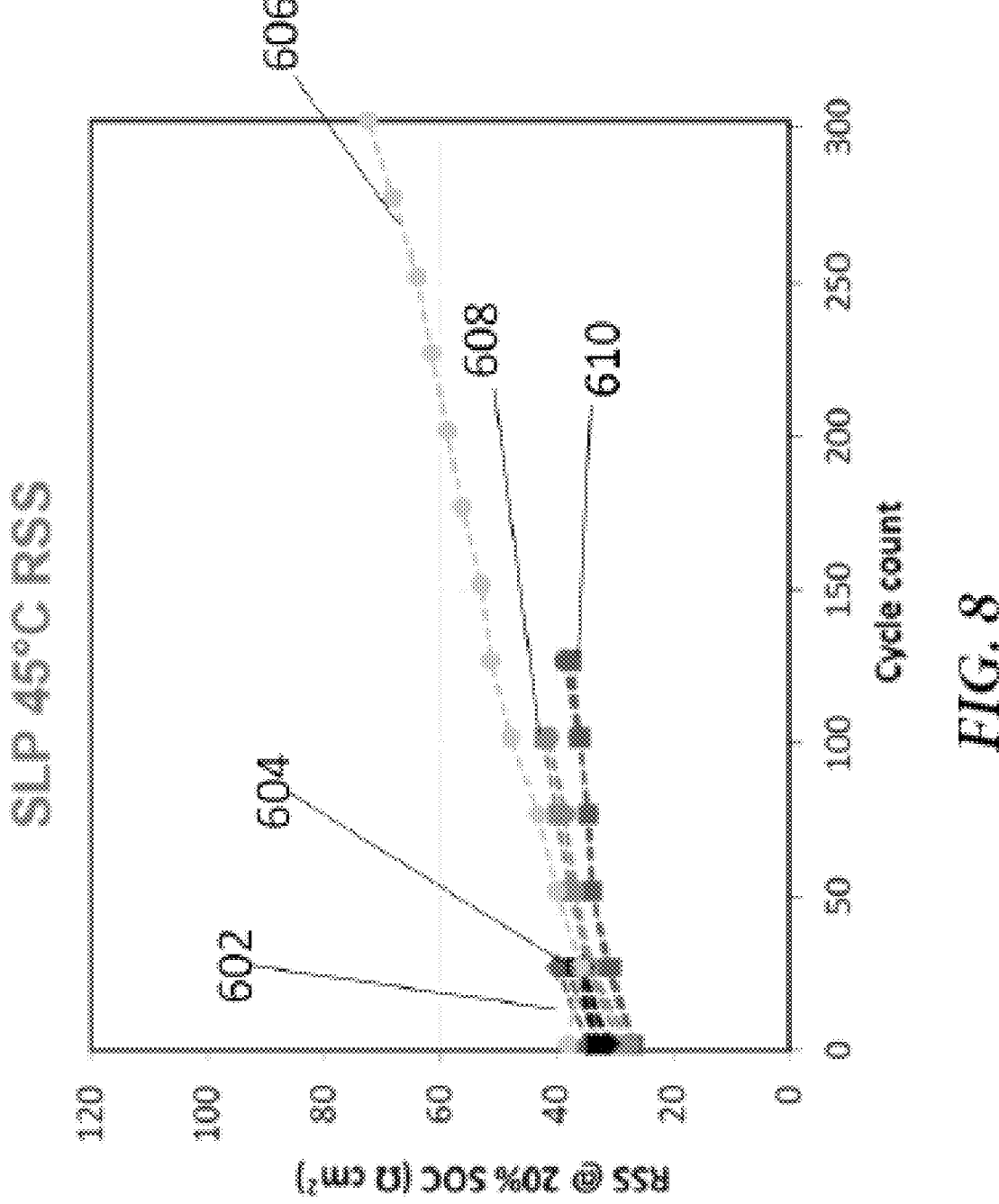
FIG. 8 depicts a plot of 20% SOC relaxation RSS growth as a function of cycle number for Li-ion batteries at 20% charge and 25° C. with different combinations of electrolyte additives, in accordance with illustrative embodiments.

FIG. 8 depicts a plot of 20% SOC relaxation RSS growth as a function of cycle number for Li-ion batteries at 20% charge and 45° C. With reference to Table 1, the energy retention as a function of cycle number was measured over for Electrolyte Fluid 2 (602), Electrolyte Fluid 3 (604), (606), Electrolyte Fluid 5 (608), and Electrolyte Fluid 4 (610).

PS has a relatively high internal resistance, as well as higher toxicity. By replacing PS with BS, the initial resistance is reduced. $LiBF_4$ can passivate the cathode surface, thereby reducing side reactions, improving both lifecycle performance and storage performance. FEC improves high temperature performance passivate the anode surface (i.e., forms an SEI).

The electrolyte fluids described herein can be valuable in battery cells, including those used in electronic devices and consumer electronic products. An electronic device herein can refer to any electronic device known in the art. For example, the electronic device can be a telephone, such as a cell phone, and a land-line phone, or any communication device, such as a smart phone, including, for example an iPhone®, an electronic email sending/receiving device. The electronic device can also be an entertainment device, including a portable DVD player, conventional DVD player, Blue-Ray disk player, video game console, music player, such as a portable music player (e.g., iPod®), etc. The electronic device can be a part of a display, such as a digital display, a TV monitor, an electronic-book reader, a portable web-browser (e.g., iPad®), watch (e.g., AppleWatch), or a computer monitor. The electronic device can also be a part of a device that provides control, such as controlling the streaming of images, videos, sounds (e.g., Apple TV®), or it can be a remote control for an electronic device. Moreover, the electronic device can be a part of a computer or its accessories, such as the hard drive tower housing or casing, laptop housing, laptop keyboard, laptop track pad, desktop keyboard, mouse, and speaker. The anode cells, lithium-metal batteries, and battery packs can also be applied to a device such as a watch or a clock.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A battery cell comprising:

a cathode comprising a cathode active material disposed on a cathode current collector;

an anode comprising an anode active material disposed on an anode current collector, the anode oriented towards the cathode such that the anode active material faces the cathode active material;

a separator disposed between the cathode active material and the anode active material; and an electrolyte fluid comprising 0.6-0.8 wt % lithium difluoro(oxalato)borate (LiDFOB), 2.0-3.0 wt % propane sultone (PS), 1.3-1.6 wt % pro-1-ene-1, 3-sultone (PES), 0.4-0.6 wt % methylene methanedisulfonate (MMDS), 0.4-0.6 wt % tris(trimethylsilyl)borate (TMSB), 6.0-8.0 wt % fluoroethylene carbonate (FEC), 1.5-2.5 wt % succinonitrile (SN), 2.5-3.5 wt % 1,3,6-hexanetricarbonitrile (HTCN), $LiPF_6$, ethylene carbonate (EC), propylene carbonate (PC), propyl propionate (PP), and ethyl propionate (EP).

2. The battery cell of claim 1, wherein the electrolyte fluid comprises 0.7 wt % LiDFOB, 2.5 wt % PS, 1.5 wt % PES, 0.5 wt % MMDS, 0.5 wt % TMSB, 7.0 wt % FEC, 2.0 wt % SN, and 3.0 wt % HTCN of the total electrolyte fluid.

3. The battery cell of claim 1, wherein the $LiPF_6$ is from 0.8 M to 1.6 M.

* * * * *